US012452569B2

(12) United States Patent
Doberstein et al.

(10) Patent No.: US 12,452,569 B2
(45) Date of Patent: Oct. 21, 2025

(54) MODULAR AUDIO ASSEMBLY FOR USE WITH VEHICLE HEADREST

(71) Applicant: HARMAN INTERNATIONAL INDUSTRIES, INCORPORATED, Stamford, CT (US)

(72) Inventors: Gerhard Doberstein, Stamford, CT (US); Riley Winton, Opelika, AL (US); David Mossington, Rochester, MI (US); Christopher Ludwig, Bloomfield Hills, MI (US); Rui Edson Justino De Oliveira, Rochester, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 160 days.

(21) Appl. No.: 18/270,136

(22) PCT Filed: Dec. 31, 2021

(86) PCT No.: PCT/US2021/065812
§ 371 (c)(1),
(2) Date: Jun. 28, 2023

(87) PCT Pub. No.: WO2022/147346
PCT Pub. Date: Jul. 7, 2022

(65) Prior Publication Data

US 2024/0064446 A1 Feb. 22, 2024

Related U.S. Application Data

(60) Provisional application No. 63/132,583, filed on Dec. 31, 2020.

(51) Int. Cl.

| | |
|---|---|
| ***H04R 1/02*** | (2006.01) |
| ***B60N 2/879*** | (2018.01) |
| ***H04R 1/32*** | (2006.01) |

(52) U.S. Cl.
CPC ............ *H04R 1/025* (2013.01); *B60N 2/879* (2018.02); *H04R 1/323* (2013.01); *H04R 2201/025* (2013.01); *H04R 2499/13* (2013.01)

(58) Field of Classification Search
CPC .. H04R 1/025; H04R 1/323; H04R 2201/025; H04R 2499/13; B60N 2/879
(Continued)

(56) References Cited

U.S. PATENT DOCUMENTS 4,042,791 A 8/1977 Wiseman
4,310,307 A * 1/1982 Bellisario ............ A61G 15/125 128/203.29
(Continued)

FOREIGN PATENT DOCUMENTS

CN 108284807 A 7/2018
CN 109691126 A 4/2019
(Continued)

OTHER PUBLICATIONS

Non-Final Office Action for U.S. Appl. No. 18/267,254, dated Feb. 12, 2025, 15 pages.
(Continued)

*Primary Examiner* — Manglesh M Patel
(74) *Attorney, Agent, or Firm* — Brooks Kushman P.C.

(57) ABSTRACT

A modular audio assembly for use with a vehicle headrest includes a speaker assembly including a support member arranged to be rotatably mounted to the vehicle headrest, and a speaker module coupled to the support member, the speaker module including a housing having a front face and at least one speaker mounted therein for generating audio output. An actuator is operably connected to the speaker assembly and configured to position the speaker assembly in an inactive position with the front face generally adjacent a lateral side of the vehicle headrest and in an active position
(Continued)

with the speaker assembly rotated away from the lateral side of the vehicle headrest and the front face oriented in an inward direction.

18 Claims, 5 Drawing Sheets

(58) Field of Classification Search
USPC .................................................... 701/49, 419
See application file for complete search history.

(56) References Cited

U.S. PATENT DOCUMENTS

| | | | | |
|---|---|---|---|---|
| 4,758,047 | A * | 7/1988 | Hennington | H04R 5/023 5/904 |
| 5,370,446 | A | 12/1994 | Bancod | |
| 5,997,091 | A | 12/1999 | Rech et al. | |
| 6,744,898 | B1 | 6/2004 | Hirano | |
| 8,950,813 | B2 | 2/2015 | Nawaz | |
| 8,985,622 | B1 | 3/2015 | Cannon | |
| 9,338,554 | B2 | 5/2016 | Christoph | |
| 9,357,304 | B2 | 5/2016 | Christoph | |
| 9,555,890 | B2 | 1/2017 | Tracy | |
| 10,239,432 | B2 | 3/2019 | Subat et al. | |
| 10,440,455 | B2 * | 10/2019 | Fox | G10K 11/17823 |
| 10,457,179 | B1 | 10/2019 | Kentley-Klay | |
| 2003/0142842 | A1 | 7/2003 | Arai et al. | |
| 2009/0206641 | A1 * | 8/2009 | Brown, Jr. | A47C 7/723 297/217.3 |
| 2010/0148550 | A1 * | 6/2010 | Kidd | B60N 2/818 381/86 |
| 2011/0081038 | A1 | 4/2011 | Tracy | |
| 2015/0043736 | A1 | 2/2015 | Olsen et al. | |
| 2015/0117668 | A1 | 4/2015 | Niss | |
| 2016/0023763 | A1 | 1/2016 | Tracy | |
| 2016/0057520 | A1 | 2/2016 | Barksdale et al. | |
| 2017/0085990 | A1 | 3/2017 | Sladeczek et al. | |
| 2017/0106775 | A1 * | 4/2017 | Takada | H04R 1/2819 |
| 2017/0214988 | A1 * | 7/2017 | Ferretti | B60N 2/68 |
| 2018/0198541 | A1 | 7/2018 | Harris et al. | |
| 2019/0106039 | A1 | 4/2019 | Winton et al. | |
| 2019/0176670 | A1 | 6/2019 | Scott et al. | |
| 2019/0182593 | A1 | 6/2019 | Guerrini et al. | |
| 2019/0202330 | A1 | 7/2019 | Subat et al. | |
| 2020/0128312 | A1 | 4/2020 | Christoph et al. | |
| 2020/0189436 | A1 | 6/2020 | Soltner | |
| 2021/0266661 | A1 | 8/2021 | Winton et al. | |
| 2022/0353614 | A1 | 11/2022 | Cai et al. | |
| 2024/0059201 | A1 | 2/2024 | Mossington et al. | |
| 2024/0064446 | A1 | 2/2024 | Doberstein et al. | |
| 2025/0080910 | A1 * | 3/2025 | Sakamoto | H04R 5/023 |

FOREIGN PATENT DOCUMENTS

| | | | |
|---|---|---|---|
| CN | 109866664 | A | 6/2019 |
| CN | 110049901 | A | 7/2019 |
| CN | 110194086 | A | 9/2019 |
| CN | 110936871 | A | 3/2020 |
| CN | 111065033 | A | 4/2020 |
| CN | 111319530 | A | 6/2020 |
| DE | 102014210105 | A1 | 12/2015 |
| DE | 102017215978 | A1 | 3/2019 |
| FR | 3114274 | A1 | 3/2022 |
| JP | S6152538 | U | 4/1986 |
| JP | 2005159914 | A | 6/2005 |
| KR | 20060090041 | A | 8/2006 |
| KR | 100629806 | B1 | 10/2006 |
| WO | 2004064369 | A2 | 7/2004 |

OTHER PUBLICATIONS

Extended European Search Report for Application No. 21916536.2, dated Oct. 23, 2024, 9 pages.
Extended European Search Report for Application No. 21916539.6, dated Oct. 24, 2024, 8 pages.
International Search Report and Written Opinion for Application No. PCT/US2021/065782, dated Mar. 24, 2022, 9 pages.
International Preliminary Report on Patentability for Application No. PCT/US2021/065782, dated Jul. 13, 2023, 8 pages.
International Search Report and Written Opinion for Application No. PCT/US2021/065787, dated Mar. 25, 2022, 9 pages.
International Preliminary Report on Patentability for Application No. PCT/US2021/065787, dated Jul. 13, 2023, 8 pages.
International Search Report and Written Opinion for Application No. PCT/US2021/065812, dated May 5, 2022, 11 pages.
International Preliminary Report on Patentability for Application No. PCT/US2021/065812, dated Jul. 13, 2023, 10 pages.
Extended European Search Report for Application No. 21916551.1, dated Oct. 17, 2024, 9 pages.
Chinese Office Action with English translation for Application No. 202180088421.2, dated Jul. 22, 2025, 20 pages.
Chinese Office Action with English translation for Application No. 202180088194.3, dated Jul. 22, 2025, 24 pages.
Non-Final Office Action for U.S. Appl. No. 18/270,061, dated Mar. 24, 2025, 11 pages.
Chinese Office Action and English translation for Application No. 202180088424.6, dated Aug. 9, 2025, 24 pages.

* cited by examiner

MODULAR AUDIO ASSEMBLY FOR USE WITH VEHICLE HEADREST

CROSS-REFERENCE TO RELATED APPLICATIONS

This application is the U.S. national phase of PCT Application No. PCT/US2021/065812 filed Dec. 31, 2021, which claims the benefit of U.S. provisional application Ser. No. 63/132,583 filed Dec. 31, 2020, the disclosures of which are hereby incorporated in their entirety by reference herein.

TECHNICAL FIELD

Embodiments relate to a modular audio assembly for seat-based audio in a vehicle, such as for use with a headrest.

BACKGROUND

Modern vehicle systems use a variety of speakers and speaker configurations. Sound quality and performance of vehicle sound systems are an important service of vehicles. In many existing designs, speakers are typically mounted in passenger doors or along a front or rear dash of the vehicle due to spacing and other constraints. There is a desire to improve upon the conventional vehicle configurations of four or five vehicle speakers. While typical vehicle configurations allow for fading sound to the front or back of a vehicle and for panning sound to the left or right side of a vehicle, the overall effect is to limit sound to a particular section of a vehicle from speakers having a fixed position.

Vehicle audio systems are increasingly based on a seat-based concept, which provides individual user-preferred listening modes in each seat. These listening modes rely heavily on the arrangement of headrest speakers, particularly the placement of headrest speakers in relation to the listener's head. Different listening modes require the speakers to be arranged in different positions in relation to the listener's head in order to create the optimal acoustical effect. Other factors, such as safety and comfort, must also be considered.

SUMMARY

In one or more embodiments, a modular audio assembly for use with a vehicle headrest includes a speaker assembly including a support member arranged to be rotatably mounted to the vehicle headrest, and a speaker module coupled to the support member, the speaker module including a housing having a front face and at least one speaker mounted therein for generating audio output. An actuator is operably connected to the speaker assembly and configured to position the speaker assembly in an inactive position with the front face generally adjacent a lateral side of the vehicle headrest and in an active position with the speaker assembly rotated away from the lateral side of the vehicle headrest and the front face oriented in an inward direction.

In one or more embodiments, the support member includes a track onto which the speaker module is movably mounted, the actuator configured to translate the speaker module along the track away from the support member into an extended configuration of the speaker assembly in the active position. The speaker assembly may be oriented generally vertically in the inactive position and the speaker assembly may be oriented generally horizontally in the active position. The actuator may be disposed within the support member.

In one or more embodiments, the speaker module includes a first speaker and a second speaker, the second speaker having a different frequency range than the first speaker. The support member has a first mating surface and the speaker module has a second mating surface, the first and second mating surfaces having complementary shapes which are arranged to abut each other when the speaker assembly is in the inactive position. In the inactive position, the speaker assembly may be generally positioned within a perimeter of the lateral side of the vehicle headrest. When mounted to the vehicle headrest, the speaker assembly is configured to be operably connected to a power source associated with the vehicle headrest to provide power to the actuator.

In one or more embodiments, a modular audio assembly for use with a vehicle headrest includes a speaker assembly including a support member arranged to be rotatably mounted to a bottom portion of the vehicle headrest, the support member including a track. A speaker module is movably mounted to the track for translation therealong, the speaker module including a housing having a front face and at least one speaker mounted therein for generating audio output. An actuator is disposed in the speaker assembly and configured to position the speaker assembly in an inactive position with the speaker assembly oriented generally vertically adjacent a lateral side of the vehicle headrest, in an active position with the speaker assembly rotated away from the lateral side of the vehicle headrest and oriented generally horizontally, and in an extended configuration of the active position with the speaker assembly oriented generally horizontally and the speaker module translated along the track away from the support member.

In one or more embodiments, an audio system for use with a vehicle headrest includes at least one modular audio assembly including a speaker assembly. The speaker assembly includes a support member arranged to be rotatably mounted to the vehicle headrest, and a speaker module coupled to the support member, the speaker module including a housing having a front face and at least one speaker mounted therein for generating audio output. An actuator is operably connected to the speaker assembly. The audio system further includes a vehicle control unit in electrical communication with the actuator to position the speaker assembly in an inactive position with the front face generally adjacent a lateral side of the vehicle headrest and in an active position with the speaker assembly rotated away from the lateral side of the vehicle headrest and the front face oriented in an inward direction.

In one or more embodiments, the vehicle control unit controls translation of the speaker module based on a stored user profile. The vehicle control unit may include a user interface configured to generate a control signal for movement of the speaker assembly in response to user input. The at least one modular audio assembly may include a left speaker assembly arranged to be rotatably mounted to a left side of the vehicle headrest and a right speaker assembly arranged to be rotatably mounted to a right side of the vehicle headrest, wherein the vehicle control unit may be configured to control the left speaker assembly independent from the right speaker assembly. The vehicle control unit may be arranged to position the speaker assembly based on a vehicle parameter including at least one of vehicle shutdown, vehicle operational mode, occupant detection, or driving condition.

DETAILED DESCRIPTION

Figure 1:
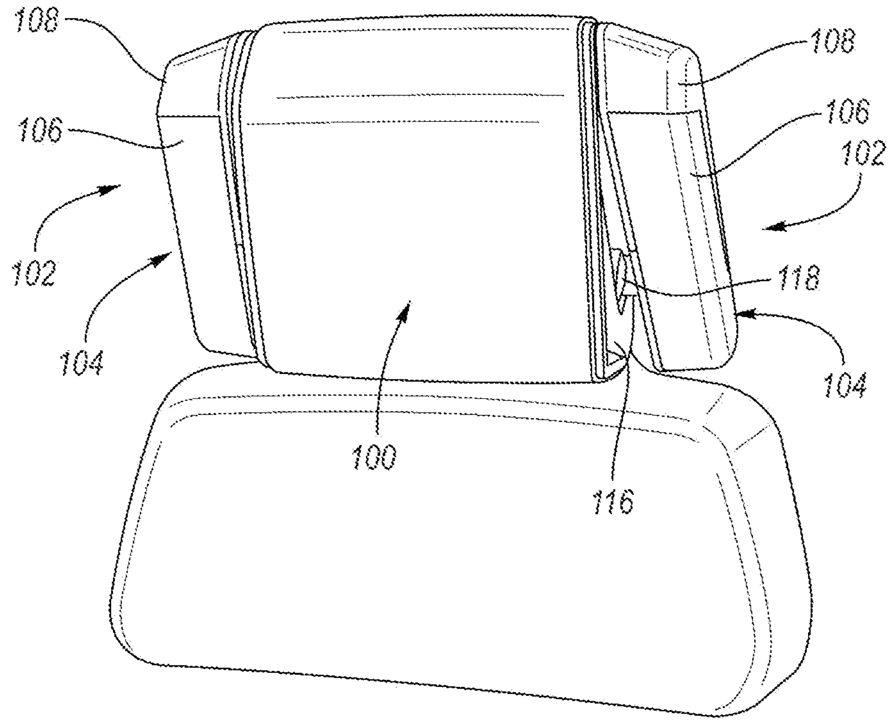
FIG. 1 illustrates a front perspective view of modular audio assemblies mounted on a vehicle headrest, each modular audio assembly including a speaker assembly in an inactive position with respect to the headrest according to one or more embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Existing vehicle speaker arrangements cannot simultaneously satisfy all requirements of acoustics, safety, and user comfort while delivering multiple advanced audio features with their optimal performance. To address this challenge, embodiments disclosed herein provide a modular audio assembly for mounting to a vehicle headrest. The modular audio assembly includes movable speakers which can have an inactive position and then be deployed into one or more active positions to offer a plurality of audio modes to the vehicle occupants. These audio modes may include, but are not limited to, Individual Sound Zones (ISZ) mode, binaural mode, and surround sound mode.

In ISZ mode, sound energy is separated from other vehicle seats, thereby producing minimal disturbances for other listeners. In ISZ mode, the best tuning performance may be achieved by placing a speaker or a speaker array on each side of the head in a specific arrangement. In particular, on each side, the speakers may be located at chin level height while staying on the same vertical plane with the ears and tilted in such a way that the main broadcasting direction of speaker points to the chin or mouth of the head of the vehicle occupant. In such an arrangement, the driver's or passenger's head can rotate freely without a blocked view.

In binaural mode, the signals received by the listener's left and right ear are carefully controlled in order to render a three-dimensional sound image in perception for audio effects and immersion and may utilize techniques involving Head Related Transfer Function (HRTF). To achieve a satisfactory binaural rendering effect, a speaker or a speaker array may be placed on each side of the head facing the ears with the same height on the same vertical plane. In this arrangement, speakers produce acoustics around the head with a natural left-right ear cross talk cancellation for mid and high frequencies (>300 Hz), which is advantageous for further application of binaural signal processing techniques. In surround sound mode, speakers are placed near or inside the headrest, behind the listeners head. This arrangement offers comfort and safety and allows unrestricted use for the driver and passengers.

Speakers having a fixed extended position do not allow for selection between different audio modes and suffer from ergonomic, safety, and regulatory issues when realized in the present day automotive environment. For example, speakers in a fixed extended position would prevent people from entering or exiting the vehicle, they can block most of the visual periphery of the occupants, and they may interfere with routine driving tasks. Having speaker modules in the desired locations for optimal performance in different audio modes is simply not feasible without a dynamic, moving solution. Embodiments disclosed herein allow the desired headrest speaker position to be achieved without restricting occupant movement, violating traffic or driving laws, or causing any discomfort to the occupants.

Embodiments disclosed herein provide modular audio assemblies with movable speaker assemblies which may be mounted to a vehicle headrest to achieve extended or retracted speaker positions for seat-based audio in a vehicle. The speaker assemblies have motorized, actuator driven, spring driven or manual mechanisms for deployment.

The disclosed embodiments allow every vehicle seat and associated headrest to be equipped with multiple advanced audio features and modes which can be activated by a vehicle occupant. The disclosed audio system allows a user to access multiple audio features in their optimal performance through different speaker arrangement deployment configurations which account for individual user's seating. Since some audio modes require more precise positioning in the speaker arrangement regarding the listener's head position to account for individual listener seating differences, a vehicle control unit in communication with the modular audio assembly may have a memory device to store the user-specific parameters. After the initial adjustment of each user's first activation of each feature, a user profile may be established and can be retrieved in the future.

Different vehicles have different seating component designs, such as headrests. If seat-based audio solutions are integrated within the head support portion of the headrest, then it may be necessary to adapt and redesign the different speaker and movement components for each type of headrest in different vehicles. Instead of that approach, embodiments disclosed herein introduce a modular design, where a common core of equipment is contained in a modular audio assembly to support the acoustic function and necessary movement. The disclosed modular audio assembly is compatible with a plurality of different headrests and is capable of providing a "plug and play" type interface with various headrests to provide audio and movement features. While the modular audio assembly is shown and described herein as being mountable to a vehicle headrest, it is contemplated that the modular audio assembly could be designed for modular application to any seat-based audio system, and thus is not limited to headrests.

FIGS. 1-5 illustrate a headrest 100 with modular audio assemblies 102 mounted thereon according to one or more embodiments. Each modular audio assembly 102 includes a speaker assembly 104 having a support member 106 arranged to be rotatably mounted to the vehicle headrest 100. The speaker assembly 104 further includes a speaker module 108 coupled to the support member 106 and includes a housing 110 having a front face 112 and at least one speaker 114 mounted therein for generating audio output. In one or more embodiments, the modular audio assembly 102 may be embodied as a "wing" assembly mountable to the lateral sides 116 of any headrest 100. While the modular audio assembly 102 is shown and described herein as being mounted on both the lateral sides 116 of the headrest 100, it is understood that alternatively only a single modular audio assembly 102 on one lateral side 116 of the headrest 100 could be employed.

In one or more embodiments, the speaker module 108 includes speakers 114, acoustic enclosures and componentry, while the support member 106 may include any secondary structure for support or movement of the speaker module 108 with respect to the headrest 100, such as one or more arms, linkages, housings, actuation points, hinges, mounting points, motors, or similar. Some examples of equipment and supporting objects in the modular audio assembly 102 include, but are not limited to, transducers (speakers, microphones, etc.), electronic components, wiring and electrical support equipment, acoustic components (sealed air chambers, resonators, ports, etc.), and sensors (occupancy detection, passenger monitoring, biometrics, etc.).

Figure 2:
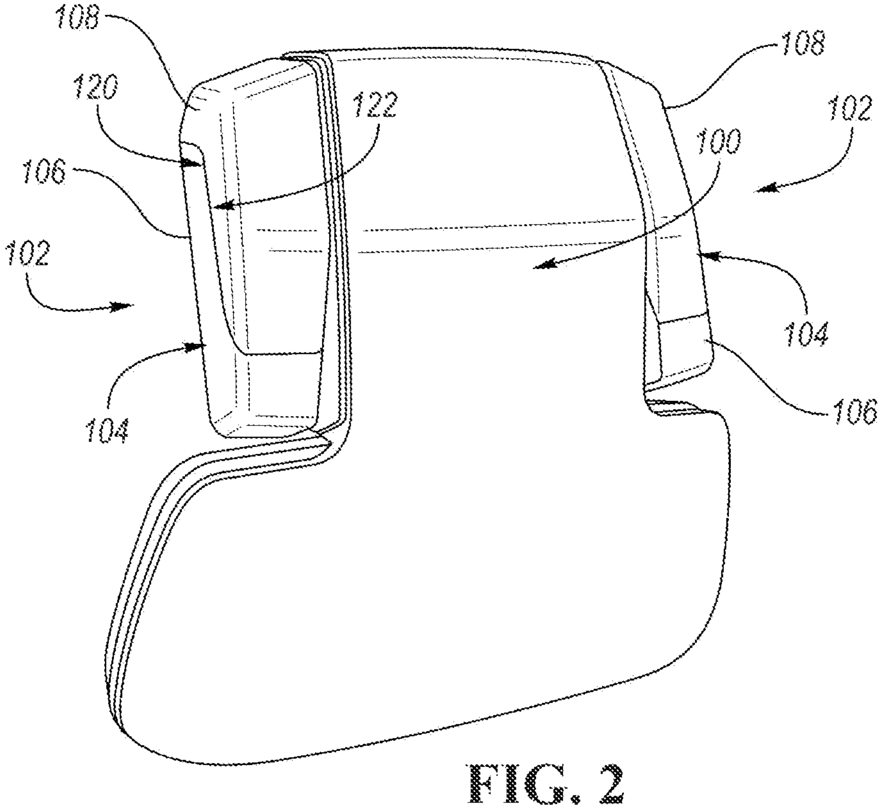
FIG. 2 illustrates a rear perspective view of a modular audio assembly mounted on a vehicle headrest with the speaker assembly in the inactive position according to one or more embodiments.

FIGS. 1 and 2 illustrate perspective views of modular audio assemblies 102 mounted on a headrest 100, each modular audio assembly 102 including a speaker assembly 104 in an inactive, retracted position with respect to the headrest 100. In one or more embodiments, the inactive position may have the speaker assemblies 104 disposed in a generally vertical orientation, so as to correspond with a height dimension of the headrest 100 and to blend aesthetically with the headrest 100. The modular audio assembly 102 may be generally positioned within a perimeter of the lateral side 116 of the headrest 100. In FIG. 1, one modular audio assembly 102 is moved aside so that the lateral side 116 is visible. The support member 106 may include a pivot member 118 (see also, FIG. 5) arranged to be received in the headrest 100 for mounting and installation of the modular audio assembly 102 to the headrest 100.

In the inactive or retracted position, the speaker modules 108 may be configured to be inactive, with the front face 112 of the speaker module 108 and the speakers 114 facing inward toward the headrest 100, generally adjacent the lateral side 116 of the headrest 100. Alternatively, the speaker modules 114 may direct audio output in at a least a forward direction. Such a retracted position of the speaker modules 108 with the front face 112 and/or speakers 114 facing forward, and one or more control signals, may allow for a surround sound mode. As shown in FIG. 2, the support member 106 may have a first mating surface 120 and the speaker module 108 may have a second mating surface 122, the first and second mating surfaces 120, 122 having complementary shapes which are arranged to abut each other when the speaker assembly 104 is in the inactive position. In an alternative embodiment, the speaker assembly 104 may have a support member 106 and speaker module 108 which are integrated together. The support members 106 and speaker modules 108 may have any suitable shapes and positioning with respect to each other, and are not limited to the configurations depicted and described herein.

Figure 3:
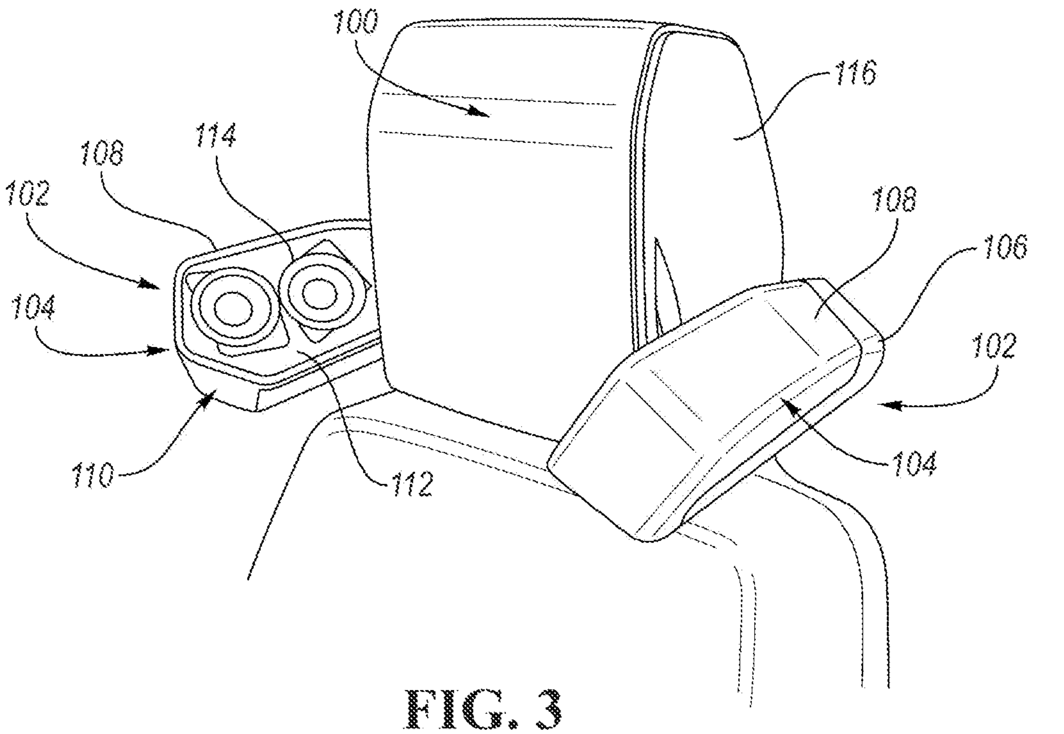
FIG. 3 illustrates a front perspective view of modular audio assemblies mounted on a vehicle headrest with the speaker assemblies in an active with respect to the headrest according to one or more embodiments.

FIG. 3 illustrates a front perspective view of the modular audio assemblies 102 with the speaker assemblies 104 in an active position with respect to the headrest 100 according to one or more embodiments. As shown, the speaker assemblies 104 may be oriented generally horizontally in the active position, with each speaker assembly 104 rotated away and forward from the lateral side 116 of the headrest 100 and the front face 112 and speakers 114 oriented in an inward direction. In the active position illustrated in FIG. 3, the first and second mating surfaces 120, 122 may be arranged to abut each other as described above. By way of example, the support members 106 and the speaker modules 108 may extend out and forward from the headrest 100 such that the speaker modules 108 are arranged to be directed towards the seat occupant's ears.

The modular audio assembly 102 may provide mechanical actuation of the support member 106 and the speaker module 108 (e.g., motorized, actuator driven, spring driven and/or retraction, etc.) to move the physical orientation of the support member 106 and speaker module 108 to enable adaptive performance for seat-based audio functionality. The support members 106 and/or speaker modules 108 may automatically, electrically, hydraulically, or mechanically be extended, retracted, rotated, translated, and/or tilted along one, two or three axes. In one or more embodiments, an actuator 124 (FIG. 5), such as a motor, is operably connected to the speaker assembly 104 and configured to position the speaker assembly 104 in various active or inactive positions. The actuator 124 may be disposed within the speaker assembly 104, such as within the support member 106. Alternatively or additionally, an actuator 124 may be disposed within the headrest 100.

Figure 4:
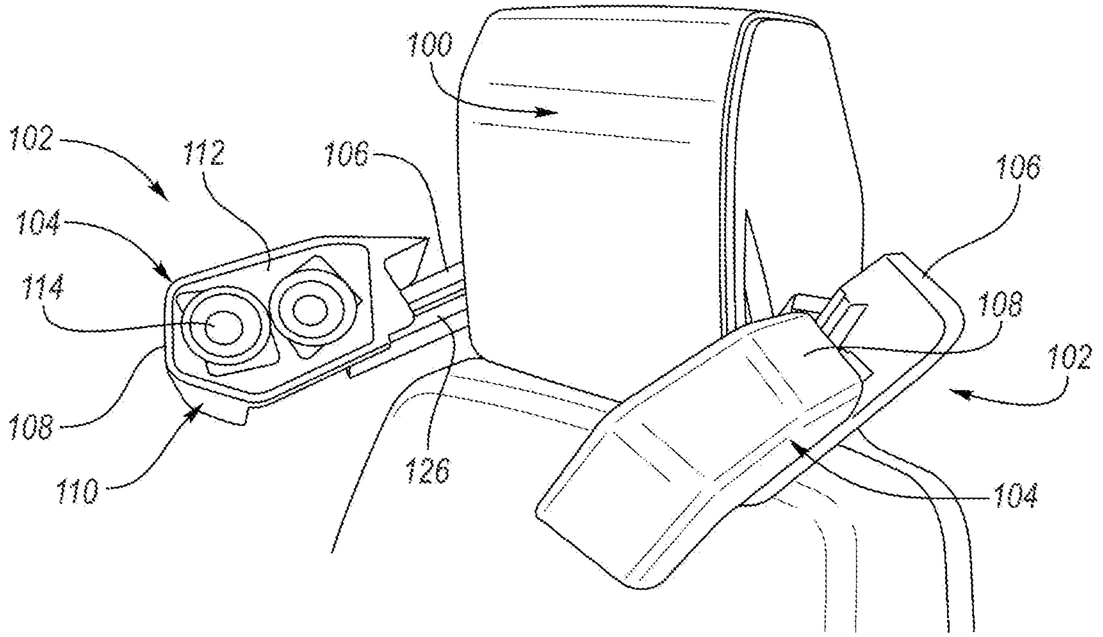
FIG. 4 illustrates a front perspective view of modular audio assemblies mounted on a vehicle headrest with the speaker assemblies in an extended configuration of the active position with respect to the headrest according to one or more embodiments.

FIG. 4 illustrates a front perspective view of the modular audio assemblies 102 with the speaker assemblies 104, specifically the speaker modules 108, in an extended configuration of the active position with respect to the headrest 100 according to one or more embodiments. Each support member 106 may include a track 126 onto which the speaker module 108 is movably mounted, the actuator 124 configured to translate the speaker module 108 along the track 126 away from the support member 106 into an extended configuration of the speaker assembly 104 in the active position. As with the configuration of FIG. 3, the support members 106 and the speaker modules 108 may extend out and forward from the headrest 100, in this case a designed or selected distance along the track 126, such that the speaker modules 108 are arranged to be directed towards the seat occupant's ears.

The active position of the speaker modules 108 shown in FIGS. 3 and 4, and one or more control signals, may allow for an ISZ mode. The speaker modules 108 may be arranged to be located at chin level height of the seat occupant while remaining on a common vertical plane with the ears of the seat occupant. Furthermore, the speaker modules 108 may be tilted in such a way that the main broadcasting direction of the speaker modules 108 is arranged to point to the chin or mouth of the seat occupant, offering an unobstructed panoramic view for the seat occupant. The position of the speaker modules 108 may positively influence the amount of passive acoustic isolation or separation between occupants, an important factor in isolation audio configurations.

Although the active position shown herein is described as corresponding with an ISZ arrangement and audio mode, other active positions are also contemplated. By way of example, the speaker modules 108 illustrated in FIGS. 3 and 4 could be configured to offer a binaural arrangement and audio mode, where sound from the speaker modules 108 may be focused towards an occupant's ears, generally in-line with the occupant's ear canal, with the speaker modules 108 located on each side of the head facing the ears with the same height on the same vertical plane.

Figure 5:
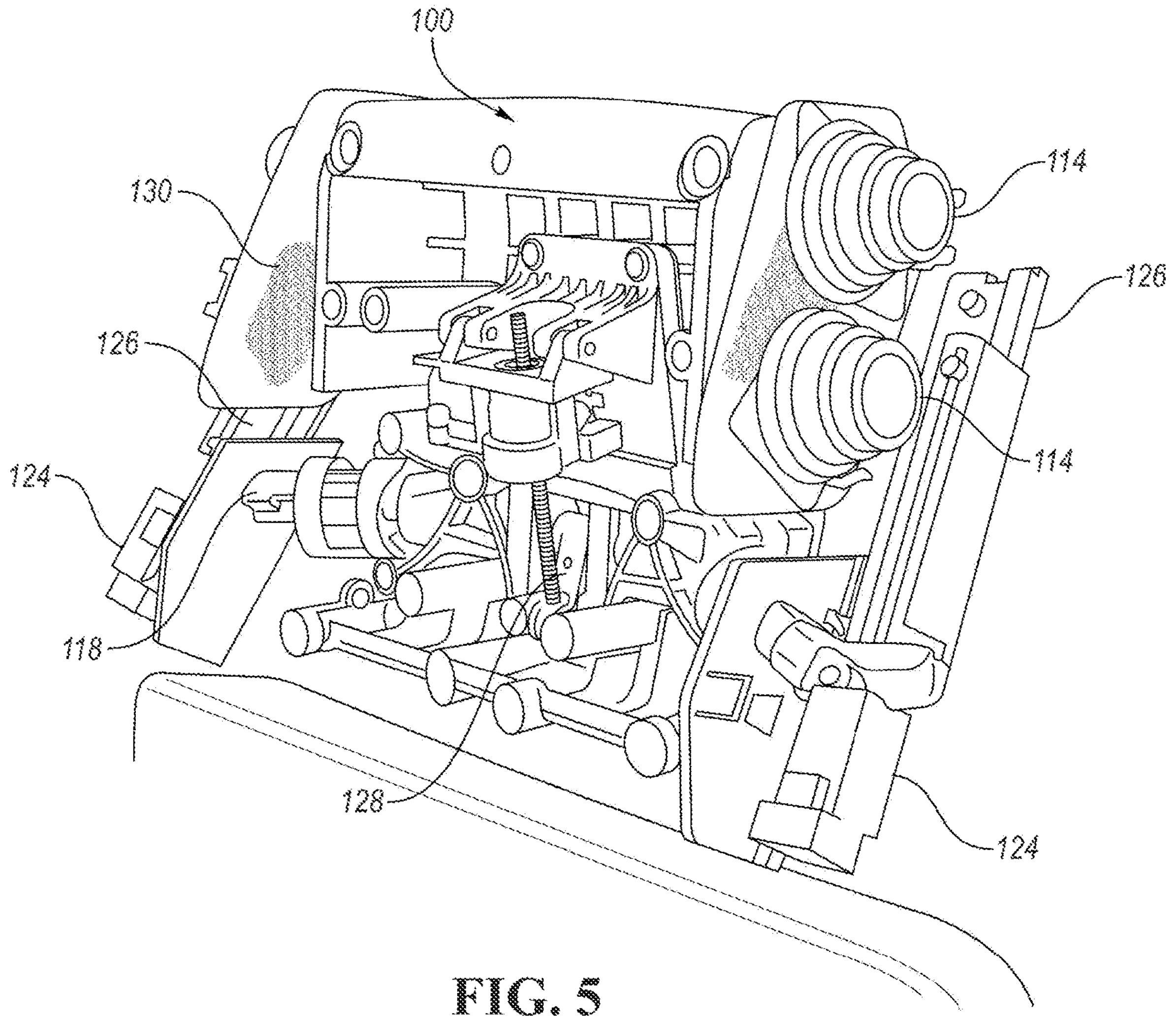
FIG. 5 illustrates internal components of the modular audio assembly according to one or more embodiments.

FIG. 5 illustrates internal components of the modular audio assembly 102 according to one or more embodiments. When mounted to the headrest 100, the modular audio assembly 102 is configured to be operably connected to a power source 128, such as associated with the headrest 100 or the vehicle seat, to provide power to the actuator 124. The pivot member 118 may including an electrical connector (not shown) configured to interface with and/or be in electrical communication with the power source 128. Alternatively, the power source 128 could be disposed on board the speaker assembly 104.

The modular audio assembly 102, such as the housing 110, may have mounting points or other methods of attachment for a modular speaker grill 130 and modular design "skin" options (e.g., plastic, cloth, leather) which can be easily changed for different vehicles and implementations. Any exterior design surfaces or materials of the modular audio assembly 102 can be modular in nature and therefore rapidly developed and deployed with specific materials, surface treatments, designs, or branding.

Figure 7:
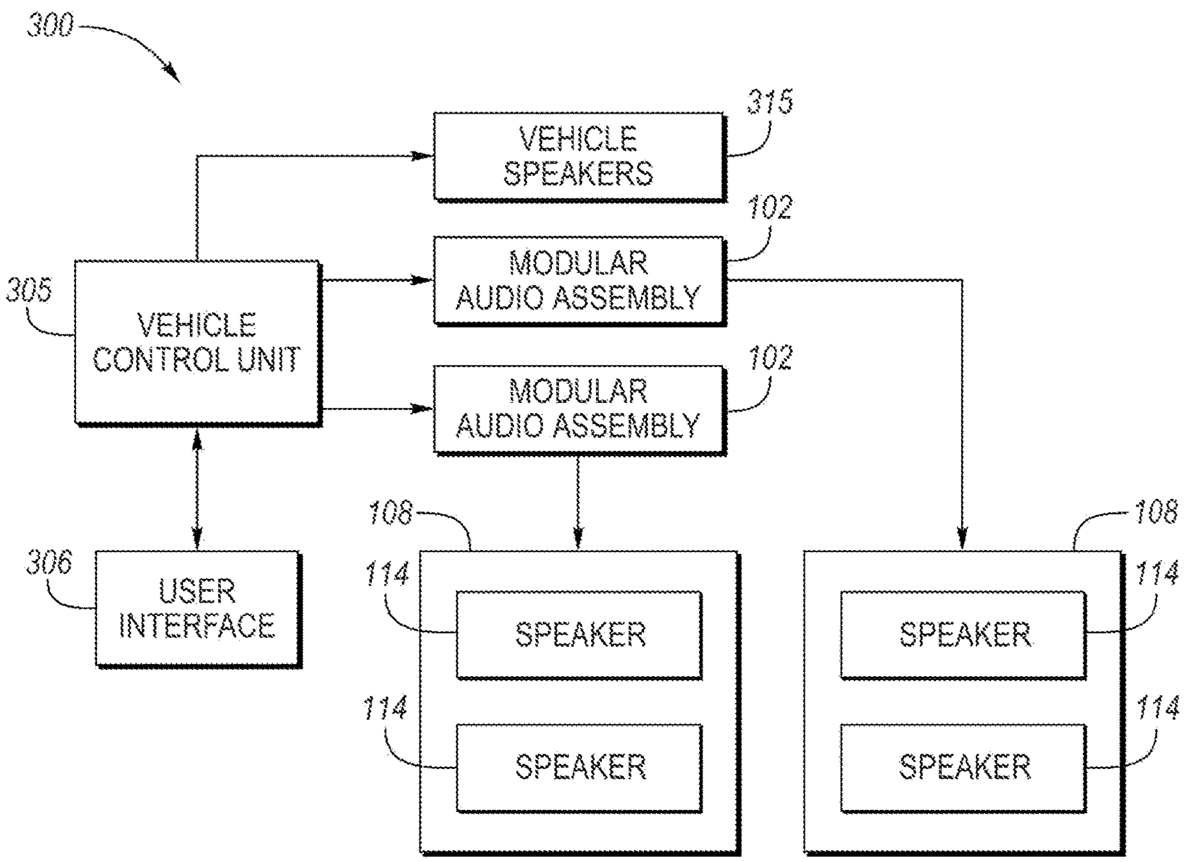
FIG. 7 depicts a graphical representation of an audio system for a vehicle according to one or more embodiments.

The speaker modules 108 may be utilized in addition to and/or independently from other vehicle speakers 315 (FIG. 7). A single speaker 114, two speakers 114, or more than two speakers 114 within each speaker module 108 is contemplated. Each speaker 114 may optionally operate with its own sealed acoustic volume so that they do not interfere with each other to the largest possible extent. When two or more speakers 114 are used, the speakers 114 may have different spectral characteristics (frequency ranges). For example, in order to improve the low frequency separation of different sound zones, one of the speakers 114 may be a lower-frequency speaker such as a woofer or a suitable midrange speaker. The other speaker 114 may be a higher-frequency speaker such as a suitable midrange speaker or tweeter. Of course, these configurations are merely exemplary, and the speaker modules 108 are not limited to the housing 110 shape or the number and placement of the speakers 114 shown or described herein. The dimensions of the speaker modules 108 and the number and characteristics of the included speakers 114 may be selected to optimize audio features and performance along with ergonomics for the vehicle occupants.

Figure 6:
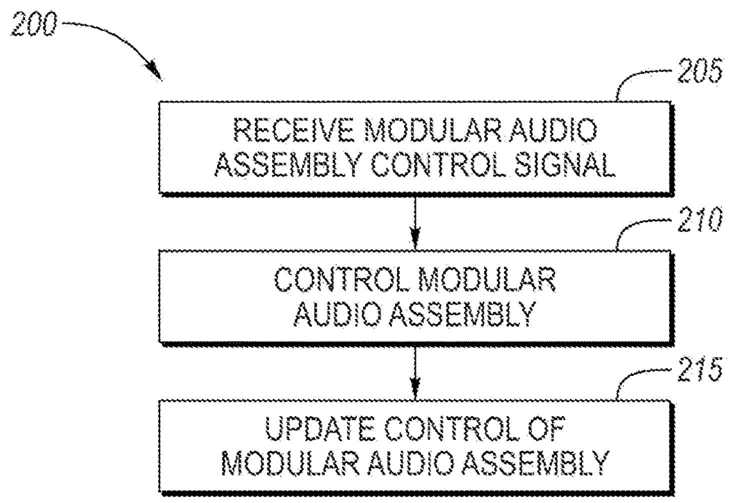
FIG. 6 depicts a process for modular audio assembly control according to one or more embodiments.

FIG. 6 depicts a process for control of a modular audio assembly 102 according to one or more embodiments. Process 200 may be employed by a vehicle control unit 305 (FIG. 7), such as an infotainment unit, head unit, and/or other control unit to control one or more modular audio assemblies 102 and speaker assembly elements (e.g., speaker modules 108). Process 200 may be initiated by receiving a modular audio assembly control signal at block 205. In one embodiment, modular audio assembly control signals may be one or more control signals to direct position of the support members 106 and speaker modules 108 to at least one of an inactive position, an active position, and an extended configuration of the active position. In addition to control of position, modular audio assembly control signals may relate to audio data, speaker control, etc. Furthermore, control of support member and speaker module position can be coupled with other seat-based position movements, for example headrest height, seat recline, etc.

At block 210, the modular audio assembly 102 may be controlled based on the control signal received at block 205. In one exemplary embodiment, modular audio assembly control includes moving the support members 106 and the speaker modules 108 from a current position to a second position (e.g., inactive position, active position, extended configuration of the active position). By way of example, the support members 106 and speaker modules 108 may be controlled to move from a retracted to an active position, or vice versa, or between different active or extended positions. In some cases, the control signal may be generated by occupant selection of a mode, such as surround sound mode, ISZ mode, or binaural mode, that directs the modular audio assembly 102 to control the position of the support members 106 and the speaker modules 108. Occupant selections may be detected based on activation of vehicle buttons and/or selections of an infotainment or other user interface 306 (FIG. 7). Although the support members 106 and the speaker modules 108 are described herein as moving in a coordinated fashion as a set, independent control and movement of the support members 106 and speaker modules 108 or the movement of only one support member 106 and corresponding speaker module 108 are also contemplated.

Controlling can include arranging the support members 106 and the speaker modules 108 in one or more of an active position, an extended configuration of the active position, and a retracted position. Controlling can include arranging the speaker modules 108 in one or more of a surround sound mode, ISZ mode, and binaural mode. Controlling can include positioning of the support members 106 and the speaker modules 108 based on a vehicle parameter including at least one of vehicle shutdown, vehicle operational mode, occupant detection, and/or driving condition. Controlling can include moving the support members 106 and the speaker modules 108 automatically between audio modes or active/inactive positions. Additionally, the position of the support members 106 and the speaker modules 108 could be adjusted continuously to enable advanced head-related speaker positioning and tracking.

At block 215, process 200 can update control of the modular audio assembly 102 and one or more speaker assembly elements (e.g., support members 106 and speaker modules 108). Process 200 allows for continuous, or regular, monitoring of vehicle control signals such that occupant selections or vehicle events can trigger modifying a position of the support members 106 and speaker modules 108. In one exemplary embodiment, vehicle shutdown or certain operational modes may control the position of the support members 106 and the speaker modules 108. For example, shutdown of the vehicle may automatically direct the support members 106 and the speaker modules 108 to a retracted and/or inactive position. Alternatively, occupant detection may result in positioning of the support members 106 and speaker modules 108 based on one or more occupant presets. According to another embodiment, driving conditions, such as highway vs. local driving, may prompt the vehicle control unit 305 (FIG. 7) to position the support members 106 and the speaker modules 108.

FIG. 7 depicts an audio system 300 according to one or more embodiments. Audio system 300 may relate to a vehicle configuration, such as an automobile or passenger vehicle configuration. According to one embodiment, a vehicle control unit 305, such as a vehicle infotainment unit, is in electrical communication with one or more modular audio assemblies 102. The vehicle control unit 305 may provide one or more of driver assistance, navigation, media, and vehicle control features. In one embodiment, audio system 300 includes a user interface 306 which may be employed to provide one or more commands or control signals to the vehicle control unit 305, including settings for speaker assembly elements (e.g., support members 106 and speaker modules 108). The actuator 124 may be in electrical communication with the vehicle control unit 305 (e.g. via an electrical connection in the pivot member 118) for causing movement of the support members 106 and speaker modules 108. Commands may be directed to one or more of directionality and movable element control as described herein. The user interface 306 may include a display and one or more input controls, such as a touch screen display to present a user interface for the vehicle control unit 305 and display of input and adjustment commands.

In one or more embodiments, the vehicle control unit 305 drives one or more vehicle speakers 315. According to another embodiment, vehicle control unit 305 controls one or more modular audio assemblies 102. Each modular audio assembly 102 may include one or more speaker modules 108, each including one or more speakers 114, and one or more support members 106 to position the speaker modules 108. According to another embodiment, the vehicle control unit 305 may be configured to control one or more of the modular audio assemblies 102 to allow for one or more adaptive audio modes, such as surround sound mode, ISZ mode, or binaural mode. According to another embodiment, the speakers 114 may operate as a speaker array. The modular audio assemblies 102 may include a left speaker assembly 104 arranged to be rotatably mounted to a left lateral side 116 of the headrest 100 and a right speaker assembly 104 arranged to be rotatably mounted to a right lateral side 116 of the headrest 100, wherein the vehicle control unit 305 may be configured to control the left speaker assembly 104 independent from the right speaker assembly 104. The vehicle control unit 305 may include a processor to perform one or more functions which may be stored in a memory module of the vehicle control unit 305. For example, the vehicle control unit 305 may control translation of the speaker modules 108 certain distances along the track 126 based on a stored user profile.

Figure 8:
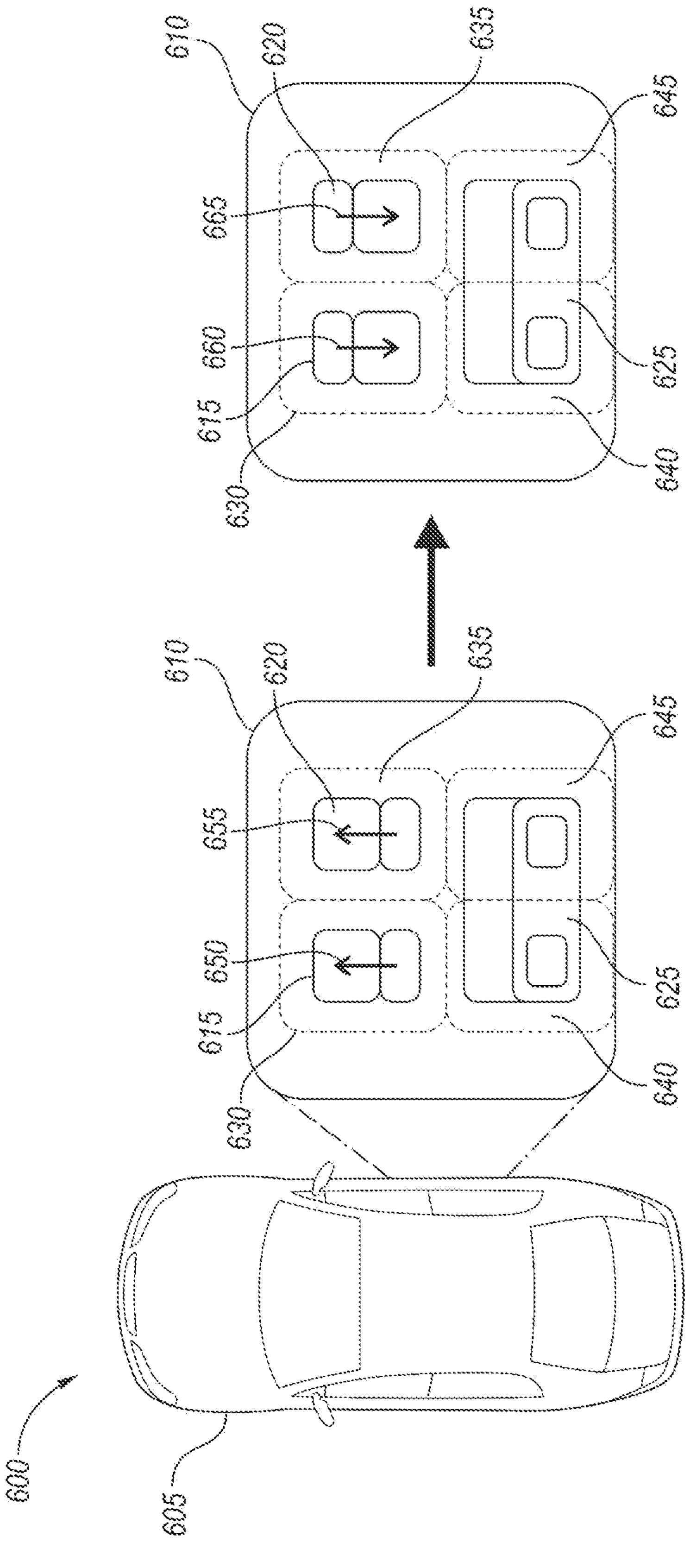
FIG. 8 depicts a vehicle cabin configuration according to one or more embodiments.

FIG. 8 depicts a vehicle cabin configuration according to one or more embodiments. Vehicle cabin configuration 600 for a vehicle 605 may allow for one or more sound zones and sound configurations. The cabin 610 of the vehicle 605 includes a plurality of seats. According to one embodiment, individual sound zones may be provided by employing configurations of the modular audio assembly 102 and speaker modules 108 for vehicle seats. Front seats, such as the driver seat 615 and the passenger seat 620, may each be associated with a dedicated zone. Passenger seats, such as the rear seat 625, may have multiple zones. The rear seat 625 is shown having a two headrest configuration for a bench seat but could be configured with three headrests. A driver zone 630 and a passenger zone 635 are shown for the driver seat 615 and the passenger seat 620, respectively. Each zone relates to an area of the vehicle 605 where sound may be directed and speaker module 108 configurations adaptively controlled to allow for a surround sound, ISZ, or binaural configuration. Rear zones 640 and 645 are shown for the left and right sections of the rear seat 625. As shown in FIG. 8, each seat and zone identified allows for the modular audio assembly 102 to be configured to provide audio output in at least one of the surround sound. ISZ, or binaural configurations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A modular audio assembly for use with a vehicle headrest, comprising:
- a speaker assembly including
  - a support member arranged to be rotatably mounted to the vehicle headrest, the support member including a track, and
  - a speaker module coupled to the support member and movably mounted to the track, the speaker module including a housing having a front face and at least one speaker mounted therein for generating audio output; and
- an actuator operably connected to the speaker assembly and configured to position the speaker assembly in an inactive position with the front face generally adjacent a lateral side of the vehicle headrest and in an active position with the speaker assembly rotated away from the lateral side of the vehicle headrest and the front face oriented in an inward direction, the actuator configured to translate the speaker module along the track away from the support member into an extended configuration of the speaker assembly in the active position.

2. The modular audio assembly of claim 1, wherein the speaker assembly is oriented generally vertically in the inactive position and the speaker assembly is oriented generally horizontally in the active position.

3. The modular audio assembly of claim 1, wherein the actuator is disposed within the support member.

4. The modular audio assembly of claim 1, wherein the speaker module includes a first speaker and a second speaker, the second speaker having a different frequency range than the first speaker.

5. The modular audio assembly of claim 1, wherein the support member has a first mating surface and the speaker module has a second mating surface, the first and second mating surfaces having complementary shapes which are arranged to abut each other when the speaker assembly is in the inactive position.

6. The modular audio assembly of claim 1, wherein in the inactive position, the speaker assembly is generally positioned within a perimeter of the lateral side of the vehicle headrest.

7. The modular audio assembly of claim 1, wherein when mounted to the vehicle headrest, the speaker assembly is configured to be operably connected to a power source associated with the vehicle headrest to provide power to the actuator.

8. A modular audio assembly for use with a vehicle headrest, comprising:
- a speaker assembly including
  - a support member arranged to be rotatably mounted to a bottom portion of the vehicle headrest, the support member including a track, and
  - a speaker module movably mounted to the track for translation therealong, the speaker module including a housing having a front face and at least one speaker mounted therein for generating audio output; and
- an actuator disposed in the speaker assembly and configured to position the speaker assembly in an inactive position with the speaker assembly oriented generally vertically adjacent a lateral side of the vehicle headrest, in an active position with the speaker assembly rotated away from the lateral side of the vehicle headrest and oriented generally horizontally, and in an extended configuration of the active position with the speaker assembly oriented generally horizontally and the speaker module translated along the track away from the support member.

9. The modular audio assembly of claim 8, wherein the speaker module includes a first speaker and a second speaker, the second speaker having a different frequency range than the first speaker.

10. The modular audio assembly of claim 8, wherein the support member has a first mating surface and the speaker module has a second mating surface, the first and second mating surfaces having complementary shapes which are arranged to abut each other when the speaker assembly is in the inactive position.

11. The modular audio assembly of claim 8, wherein in the inactive position, the speaker assembly is generally positioned within a perimeter of the lateral side of the vehicle headrest.

12. An audio system for use with a vehicle headrest, the audio system comprising:

at least one modular audio assembly including
a speaker assembly including
a support member arranged to be rotatably mounted to the vehicle headrest, the support member including a track, and
a speaker module coupled to the support member and movably mounted to the track, the speaker module including a housing having a front face and at least one speaker mounted therein for generating audio output; and
an actuator operably connected to the speaker assembly; and
a vehicle control unit in electrical communication with the actuator to position the speaker assembly in an inactive position with the front face generally adjacent a lateral side of the vehicle headrest, in an active position with the speaker assembly rotated away from the lateral side of the vehicle headrest and the front face oriented in an inward direction, and to translate the speaker module along the track away from the support member into an extended configuration of the speaker assembly in the active position.

13. The audio system of claim 12, wherein the vehicle control unit controls translation of the speaker module based on a stored user profile.

14. The audio system of claim 12, wherein the speaker module includes a first speaker and a second speaker, the second speaker having a different frequency range than the first speaker.

15. The audio system of claim 12, wherein the vehicle control unit includes a user interface configured to generate a control signal for movement of the speaker assembly in response to user input.

16. The audio system of claim 12, wherein the at least one modular audio assembly includes a left speaker assembly arranged to be rotatably mounted to a left side of the vehicle headrest and a right speaker assembly arranged to be rotatably mounted to a right side of the vehicle headrest.

17. The audio system of claim 16, wherein the vehicle control unit is configured to control the left speaker assembly independent from the right speaker assembly.

18. The audio system of claim 12, wherein the vehicle control unit is arranged to position the speaker assembly based on a vehicle parameter including at least one of vehicle shutdown, vehicle operational mode, occupant detection, or driving condition.

* * * * *